(12) United States Patent
An et al.

(10) Patent No.: US 10,099,587 B2
(45) Date of Patent: Oct. 16, 2018

(54) ARMREST LOCKING DEVICE

(71) Applicant: HYUNDAI DYMOS INCORPORATED, Seosan-si Chungcheongnam-do (KR)

(72) Inventors: Sung Chol An, Hwaseong-si (KR); Jin Ho Seo, Yongin-si (KR); Jun Kyu Kim, Hwaseong-si (KR); Chan Uk Park, Gyeongju-si (KR); Myeong Sub Kim, Seongnam-si (KR); Yun Ho Kim, Osan-si (KR); Doug Hwan Kim, Hwaseong-si (KR)

(73) Assignee: HYUNDAI DYMOS INCORPORATED, Seosan-si Chungcheongnam-do (KR)

( * ) Notice: Subject to any disclaimer, the term of this patent is extended or adjusted under 35 U.S.C. 154(b) by 31 days.

(21) Appl. No.: 15/327,185

(22) PCT Filed: Jul. 9, 2015

(86) PCT No.: PCT/KR2015/007110
§ 371 (c)(1),
(2) Date: Jan. 18, 2017

(87) PCT Pub. No.: WO2016/013788
PCT Pub. Date: Jan. 28, 2016

(65) Prior Publication Data
US 2017/0158098 A1 Jun. 8, 2017

(30) Foreign Application Priority Data

Jul. 25, 2014 (KR) ........................ 10-2014-0094560

(51) Int. Cl.
*B60N 2/75* (2018.01)
*A47C 13/00* (2006.01)

(52) U.S. Cl.
CPC .............. *B60N 2/757* (2018.02); *A47C 13/00* (2013.01); *B60N 2/75* (2018.02); *B60N 2/753* (2018.02)

(58) Field of Classification Search
CPC .......... B60N 2/757; B60N 2/753; B60N 2/75; B60N 2/46; B60N 2/4606; B60N 2/4613; A47C 13/00
(Continued)

(56) References Cited

U.S. PATENT DOCUMENTS

2017/0015225 A1\* 1/2017 Shin .................... B60R 11/0235

FOREIGN PATENT DOCUMENTS

JP 2001-037578 A 2/2001
JP 10-2003-0006652 A 1/2003
(Continued)

OTHER PUBLICATIONS

Translation of International Search Report, PCT/KR2015/007110, filed Jul. 9, 2015, dated Oct. 6, 2015, 2pp.

*Primary Examiner* — Mark R Wendell
(74) *Attorney, Agent, or Firm* — Brinks Gilson & Lione

(57) ABSTRACT

The present disclosure provides an armrest-locking device that is disposed in an armrest that is stowed in an armrest case of a rear seatback. The armrest-locking device includes: a locking member disposed at any one of the armrest case and the armrest; a locking bracket rotatably coupled to the other one of the armrest case and the armrest, the locking member inserted into a groove formed on a peripheral portion of the locking bracket when the armrest is stowed; and a holding bracket. In particular, the locking bracket rotates in a forward direction to be fastened to the locking member when the locking member is inserted; and the holding bracket has an end to engage with the locking
(Continued)

bracket when the locking bracket is rotated, maintaining the rotation state of the locking bracket.

9 Claims, 5 Drawing Sheets

(58) Field of Classification Search
USPC .................................................. 297/411.32
See application file for complete search history.

(56) References Cited

FOREIGN PATENT DOCUMENTS

| | | |
|---|---|---|
| KR | 10-1337910 B1 | 12/2013 |
| KR | 20-0471361 Y1 | 2/2014 |
| KR | 10-1417066 B1 | 7/2014 |

* cited by examiner

[FIG.1]
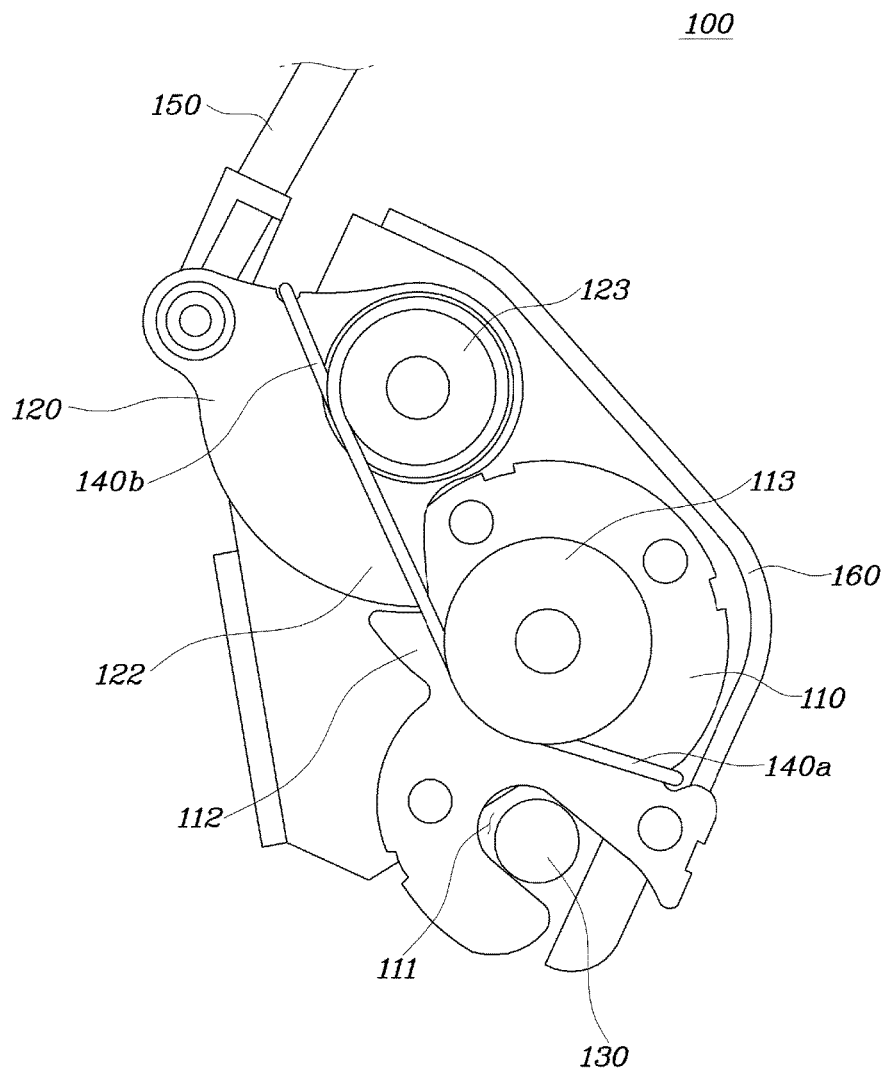

[FIG.2a]
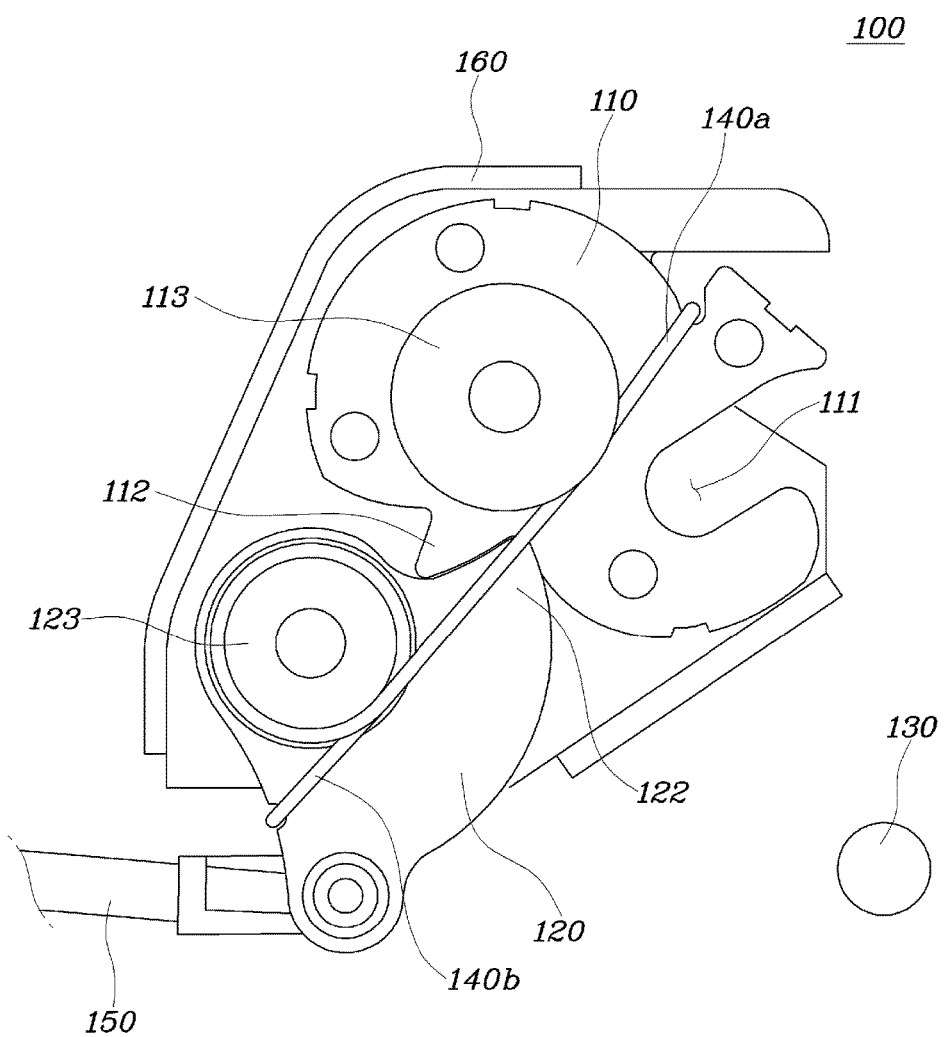

[FIG.2b]
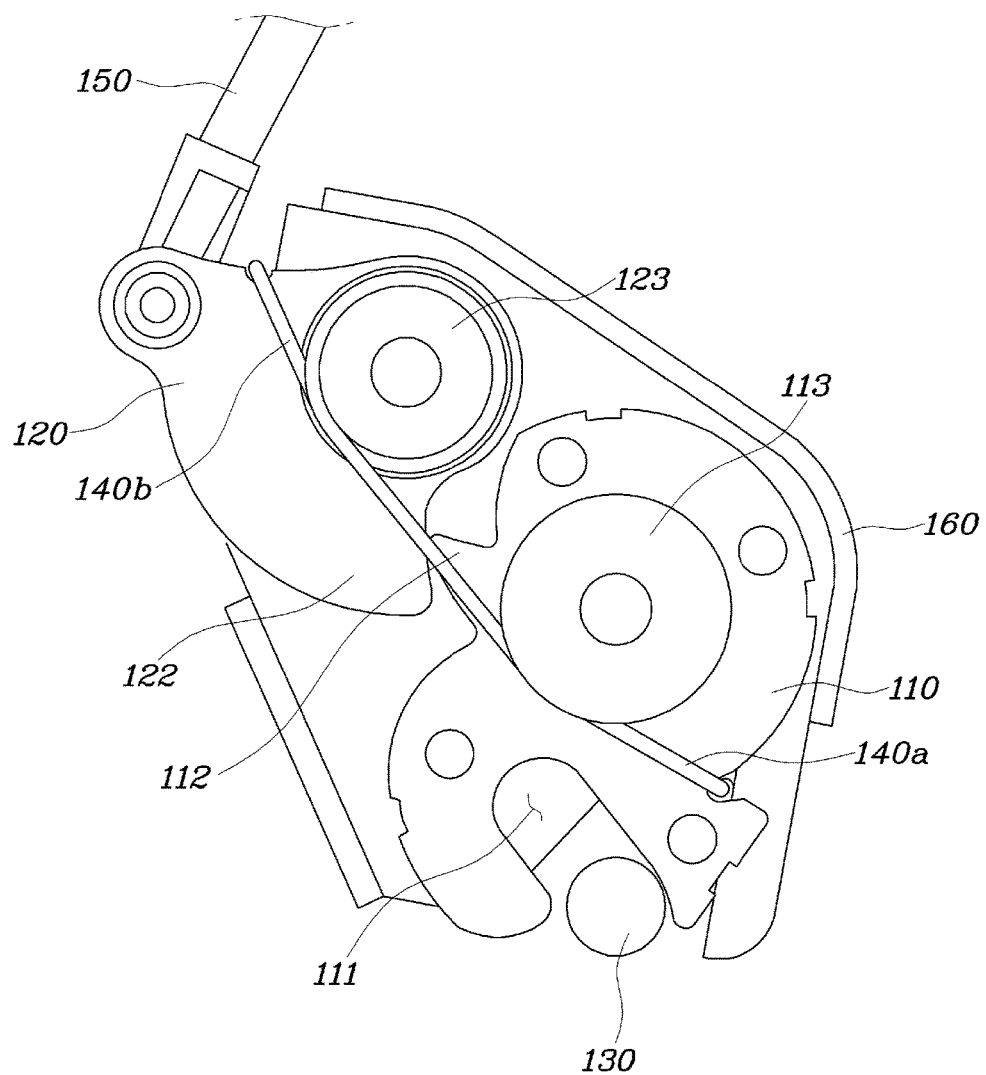

[FIG.2c]
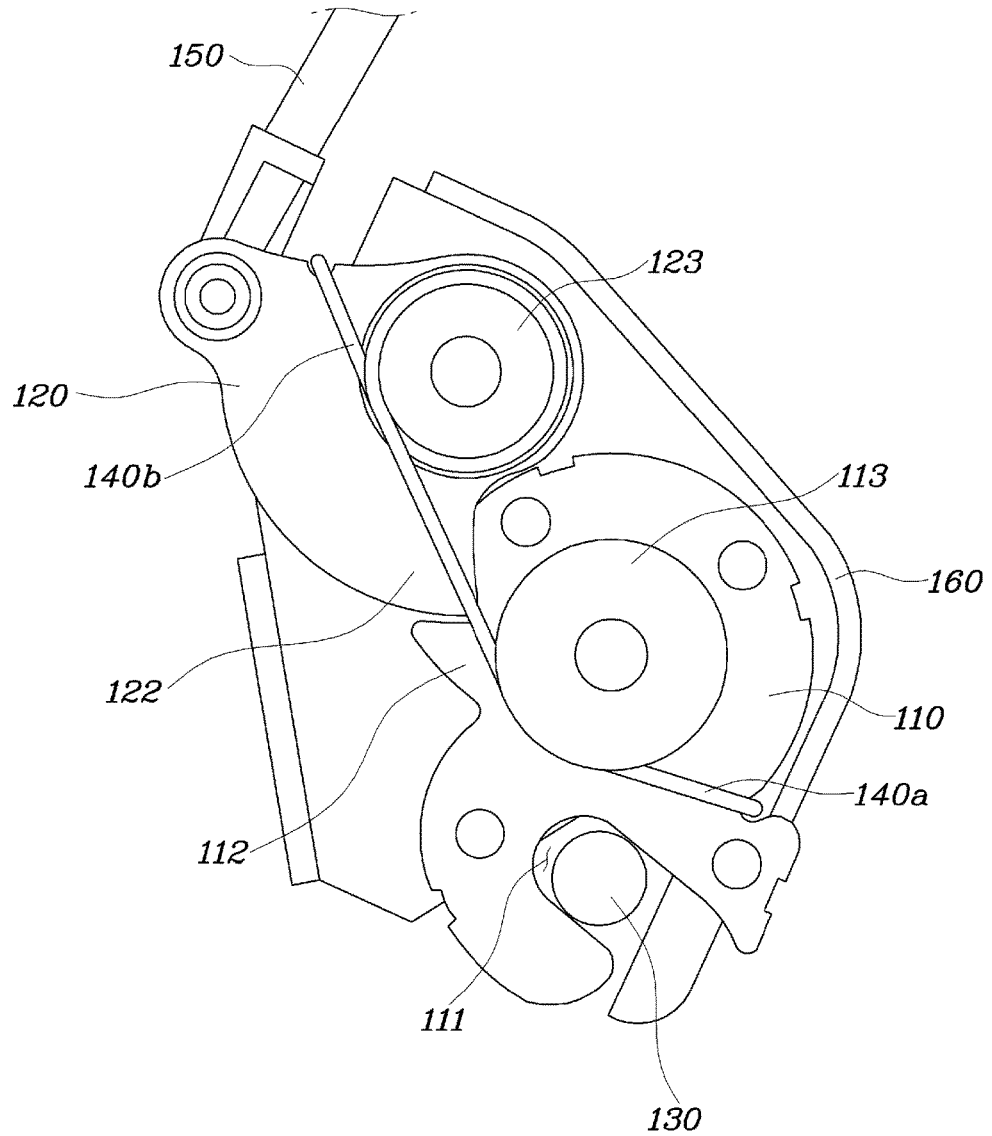

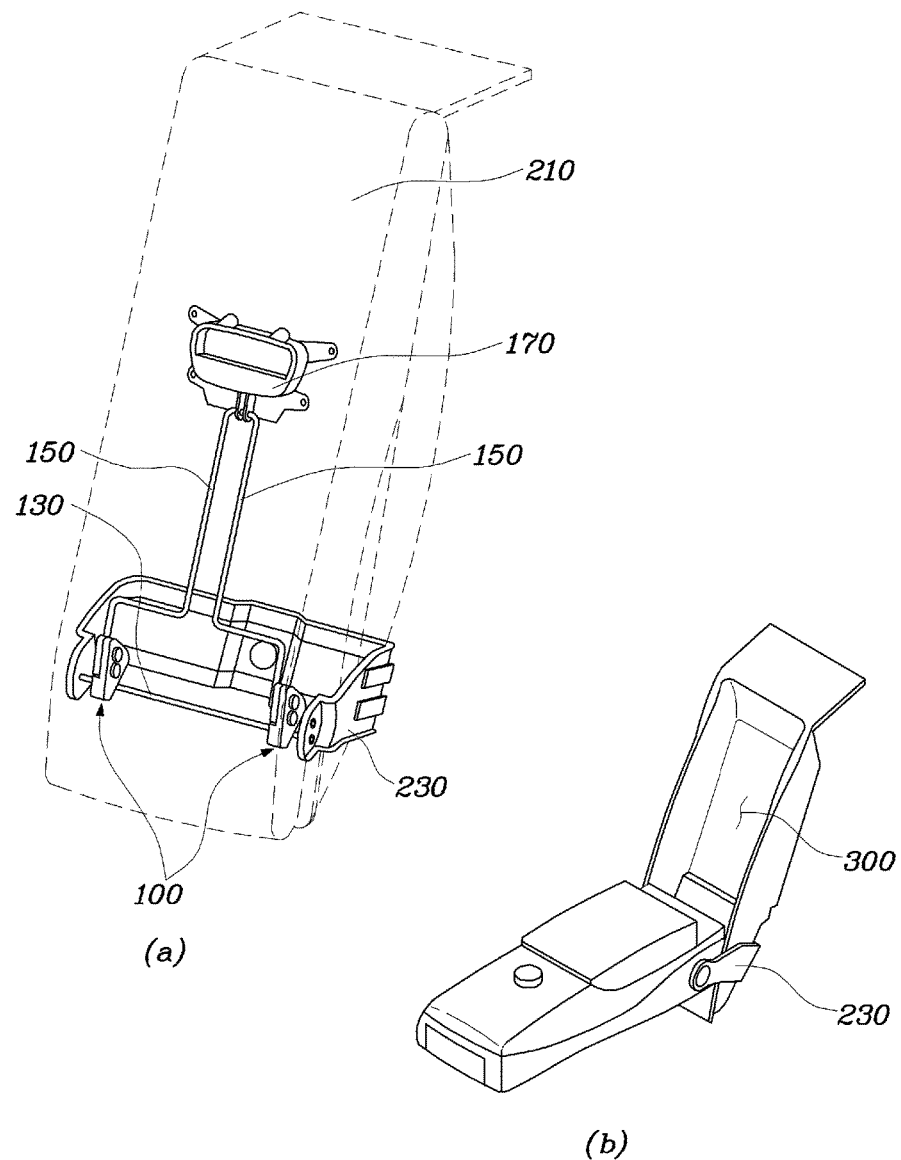
[FIG.3]

ARMREST LOCKING DEVICE

CROSS-REFERENCE TO RELATED APPLICATIONS

This application is a nationalization of International Application No. PCT/KR2015/007110, filed on Jul. 9, 2015, which claims priority to and the benefit of Korean Patent Application No. 10-2014-0094560, filed on Jul. 25, 2014, the entirety of each of which are hereby incorporated by reference.

FIELD

The present disclosure relates to an armrest-locking device and, more particularly, to an armrest-locking device that prevents an armrest from being pulled out so that the armrest can be stowed in an armrest case in a rear seatback.

BACKGROUND

In general, rear seats are equipped with armrests for preventing accumulation of fatigue of passengers in the rear seats by supporting the arms of the passengers and attenuating tension and armrest cases for receiving the armrests are formed in the seatback so that the armrest can be selectively drawn out or received, only if necessary.

In the related art, since an armrest is simply inserted in an armrest case, the armrest is unexpectedly pulled out when a vehicle suddenly stops or collides an object, so there is a problem that a portion of a passenger or stuffs of the passenger are stuck between a seat cushion and an armrest and damaged accordingly.

Accordingly, as disclosed in Utility Patent Publication No. KR20-0471361 Y1, titled "Seat armrest for vehicles", there has been proposed a fastening device for preventing free rotation of an armrest by engaging gears, but we have discovered that there is still a problem that the fastening between gears are separated and the armrest is unexpectedly pulled out in a collision of a vehicle.

The description provided above as a related art of the present disclosure is just for helping understanding the background of the present disclosure and should not be construed as being included in the related art known by those skilled in the art.

SUMMARY

The present disclosure provides an armrest-locking device that can more firmly fasten and more easily unfasten an armrest to inhibit or prevent the armrest from being unexpectedly pulled out due to an impact from the outside.

In one form of the present disclosure, an armrest-locking device that is disposed in an armrest that is stowed in an armrest case of a rear seatback. The armrest-locking device may include: a locking member disposed at any one of the armrest case or the armrest; a locking bracket rotatably coupled to the other one of the armrest case or the armrest, the locking member configured to insert into a groove formed on a peripheral portion of the locking bracket when the armrest is stowed; and a holding bracket having an end configured to hold and engage with the locking bracket when the locking bracket is rotated, thereby maintaining the rotation state of the locking bracket. In particular, the locking bracket is configured to rotate in a forward direction to be fastened to the locking member when the locking member is inserted.

The locking bracket may be provided in a pair and the pair of locking brackets are disposed at positions corresponding to both sides of the armrest.

The holding bracket may be rotatably hinged to the armrest case or the armrest where the locking bracket is disposed.

A first protrusion may be formed on the peripheral portion of the locking bracket and configured to engage with a second formed on the peripheral portion of the holding bracket.

The armrest-locking device may further include a first elastic portion that applies backward torque to the locking bracket when the locking bracket is rotated forward, and a second elastic portion that applies forward torque to the holding bracket when the holding bracket is rotated backward.

When the locking member is not inserted into the groove, a backward side of the second protrusion may be in contact with a forward side of the first protrusion, thereby inhibiting or preventing forward rotation of the locking bracket, and when the locking member is inserted into the groove, a forward side of the second protrusion may be in contact with a backward side of the first protrusion, thereby inhibiting or preventing backward rotation of the locking bracket by the first elastic portion.

When the forward side of the second protrusion is in contact with the backward side of the first protrusion so that a contract surface is formed, a virtual line perpendicular to the contact surface may go through a rotational center of the holding bracket.

Wires may be connected to the peripheral portion of the holding bracket to rotate the holding bracket backward when being pulled.

The locking member may be formed in the shape of a bar and may be inserted into the groove in a direction perpendicular to an axial direction of the locking member.

In forms of the armrest-locking device having the structure described above, unlocking is possible only by operating the wires, so unlocking can be more easily performed.

Further, since the locking bracket is rotated and locked after the locking member is inserted in the groove, the locking member can be more firmly coupled without being separated out of the groove in sudden stop or in a collision.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view showing the configuration of an armrest-locking device in one form of the present disclosure;

FIGS. 2A to 2C are views showing a process of locking the armrest-locking device in one form of the present disclosure; and FIG. 3 is a view showing a state when an armrest-locking device has been installed.

The drawings described herein are for illustration purposes only and are not intended to limit the scope of the present disclosure in any way.

DETAILED DESCRIPTION

An armrest-locking device in one form of the present disclosure is described hereafter with reference to the accompanying drawings.

FIG. 1 is a view showing the configuration of an armrest-locking device, FIGS. 2A to 2C are views showing a process of locking the armrest-locking device, and FIG. 3 is a view showing a state when an armrest-locking device has been installed.

As shown in FIG. 1, an armrest-locking device 100 in one form of the present disclosure, which is disposed in an armrest that is stowed in an armrest case 300 in a rear seatback, includes: a locking member 130 disposed at any one of the armrest case 300 and the armrest 210; a locking bracket 110 rotatably coupled to the other one of the armrest case 300 and the armrest 210, on a peripheral portion of which a groove 111 into which the locking member 130 is inserted when the armrest 210 is stowed is formed, and which rotates in a forward direction to be fastened to the locking member 130 when the locking member 130 is inserted; and a holding bracket 120 an end of which is configured to hold and engage with the locking bracket 110 when the locking bracket 110 is rotated, maintaining the rotation state of the locking bracket 110.

In detail, FIG. 3A is a view when the armrest is stowed in the armrest case and FIG. 3B is a view when the armrest is pulled out. The locking member 130, as shown in FIG. 3, is disposed in the armrest case 300 and the armrest-locking device 100 except for the locking member 130 may be disposed in the armrest 210, but the installation positions may be set in various ways, depending on the intention of a designer or the layout of a lever 170 for operating the armrest-locking device 100 and wires 150 to be described below. In this form, it is exemplified that the entire armrest-locking device 100 is disposed in the armrest 210.

Further, the locking member 130 may have various shapes such as a hook and a ring. In one form, it may be formed in the shape of a bar, and as shown in FIG. 1, it may be locked to the locking bracket 110 by being inserted in the groove 111, perpendicularly to the axial direction. Both ends of the locking member 130, as shown in FIG. 3, may be supported at both sides of the armrest case 300 or may be locked and supported to specific coupling members 230 at both sides of the armrest case 300.

Further, the armrest-locking device 100 except for the locking member 130 may be provided in pair and disposed at positions corresponding to both sides of the armrest 210. This is for stably fixing the armrest by more firmly coupling the armrest.

Meanwhile, as shown in FIG. 1, the locking bracket 110 is formed in the shape of a panel, and has the groove 111 formed in an outer circumferential portion of the locking bracket 110. The groove 111 is opened outside. The locking bracket 110 may be disposed such that the radial direction is perpendicular to the locking member 130. Obviously, the locking bracket 110 is not limited to the shape of a panel.

The locking bracket 110 is hinged to the armrest at the center by a hinge shaft 113 to freely rotate, so when the locking member 130 is inserted into the groove 111 and the locking bracket 110 is rotated, the locking member 130 inserted in the groove 111 is moved and locked with forward rotation of the locking bracket 110.

Meanwhile, a center of the holding bracket 120, which has the shape of a panel, can be coupled rotatably to the armrest by the hinge shaft 123 and the peripheral portion of the holding bracket may be positioned close to the peripheral portion of the locking bracket 110 to face each other. Obviously, the holding bracket 120 is not limited to the shape of a panel.

A first protrusion 112 may be radially formed on the peripheral portion of the locking bracket 110 and a second protrusion 122 that comes in contact with the first protrusion 112 may be formed on the peripheral portion of the holding bracket 120 such that the protrusions face each other.

Further, there may be provided a first elastic portion 140a that applies backward torque to the locking bracket 110 when the locking bracket 110 is rotated forward, and a second elastic portion 140b that applies forward torque to the holding bracket 120 when the holding bracket 120 is rotated backward. The first elastic portion 140a and the second elastic portion 140b may be elastic springs or may be torsion springs that are respectively wound around the hinge shafts 113 and 123 of the locking bracket 110 and the holding bracket 120 such that their ends apply torque to the locking bracket 110 or the holding bracket 120, respectively. The first elastic portion 140a and the second elastic portion 140b, as shown in FIG. 1, may be connected to each other to make one elastic portion, in which both ends may be in contact with the locking bracket 110 and the holding bracket 120, respectively, to apply torque. When torsion springs are used, the space for the elastic portions can be reduced, so it may be advantageous in terms of layout, but torsion springs are not used necessarily, and the first elastic portion 140a and the second elastic portion 140b may be implemented in various ways.

Meanwhile, the operation of the armrest-locking device 100 using the configuration described above is described with reference to FIGS. 2A to 2C. FIG. 2A is a view showing a state before the locking member 130 is inserted in the groove 111, FIG. 2B is a view showing a state when the locking member 130 is inserted into the groove 111, and FIG. 2C is a view showing when the locking member 130 is fully inserted and locked in the groove 111 by stowing the armrest in the armrest case.

As shown in FIG. 2A, when the locking member 130 is not inserted, the backward side of the second protrusion 122 is in contact with the forward side of the first protrusion 112, whereby forward rotation of the locking bracket 110 is interrupted and free rotation of the locking bracket 110 is inhibited or prevented by the elasticity of the second elastic portion 140b.

Thereafter, as shown in FIG. 2B, when the locking member 130 is inserted into the groove 111 and the locking bracket 110 is rotated forward, the first protrusion 112 pushes the second protrusion 122, thereby rotating the holding bracket 120 backward against the elasticity of the second elastic portion 140b.

When the locking member 130 is further inserted and fully inserted in the groove 111, as shown in FIG. 2C, the first protrusion 112 is moved over the second protrusion 122, so the forward side of the second protrusion 122 is brought in contact with the backward side of the first protrusion 112, and from this state, backward rotation of the locking bracket 110 is inhibited or prevented by the first elastic portion 140a.

When the locking member 130 is fully inserted and locked in the groove 111, the locking bracket 110 receives continuously backward torque by the first elastic portion 140a, and the contact surface and the shapes of the first protrusion 112 and the second protrusion 122 may be set such that a virtual line perpendicular to the contact surface goes through the rotational center of the holding bracket 120 to support the locking bracket when the forward side of the second protrusion 122 is brought in contact with the backward side of the first protrusion 112.

The torque of the first elastic portion 140a may direct toward the rotational center of the holding bracket 120, so the locking bracket 110 can keep locked to the locking member 130 without rotating the holding bracket 120.

In order to inhibit or prevent the locking bracket 110 from being separated out of the groove 111 in a state where the locking bracket 110 is locked to the locking member 130, a housing 160 having a cover may be further provided outside the locking bracket 110 along the rotational radius of the locking bracket 110. The housing 160 may be formed to partially cover the locking bracket 110 and the holding bracket 120 or to completely cover the locking bracket 110 and the holding bracket 120. The cover may be formed to cover the inlet of the groove 111 in a state where the locking bracket 110 is locked to the locking member 130.

Meanwhile, wires 150 to rotate the holding bracket 120 backward when it is pulled may be connected to the peripheral portion of the holding bracket 120 to release the locking state. That is, one end of each of the wires 150 is connected to the holding bracket 120, so when the wires 150 are pulled, the holding bracket 120 is rotated backward and the second protrusion 122 is moved over the first protrusion 112 such that the backward side of the second protrusion 122 is brought in contact with the forward side of the first protrusion 112, thereby the locking state is released. That is, when the wires 150 are pulled, the locking bracket 110 is rotated backward by the first elastic portion 140a, whereby the locking state is finally released. This operation is performed in the inverse order of the locking operation.

Meanwhile, as shown in FIG. 3A, the lever 170 for releasing the locking may be disposed on the armrest. The ends of the wires 150 are respectively connected to a pair of holding brackets 120 and the other ends of the wires 150 may be both connected to the lever 170, so when the lever 170 is operated, the pair of holding brackets are simultaneously rotated, whereby they can be unlocked.

Further, a specific damper (not shown) may be disposed between the housing 160 and the locking bracket 110 to be coupled to the housing 160 so that a racket can attenuate an impact and function as a stopper by coming into contact with the locking bracket 110 when being rotated backward by the first elastic portion 140a. A contact protrusion that protrudes toward the housing 160 to come into contact with the damper may be formed on the locking bracket 110.

According to the armrest-locking device having the structure described above, unlocking is possible by operating the wires 150, so unlocking can be more easily performed.

Further, since the locking bracket 110 is rotated and locked after the locking member 130 is inserted in the groove 111, the locking member can be more firmly coupled without being separated out of the groove 111 in a sudden stop or in a collision.

Although the present disclosure was described with reference to specific forms shown in the drawings, it is apparent to those skilled in the art that the present disclosure may be changed and modified in various ways without departing from the scope of the present disclosure.

The invention claimed is:

1. An armrest-locking device disposed in an armrest and configured to be stowed in an armrest case of a rear seatback, the device comprising:
    a locking member disposed at one of the armrest case or the armrest;
    a locking bracket rotatably coupled to the other one of the armrest case or the armrest and having a groove formed on a peripheral portion of the locking bracket, wherein the locking member is configured to insert into the groove of the locking bracket while the locking bracket rotates in a forward direction toward a stowed position of the armrest, and the locking bracket is fastened to the locking member when the locking member is fully inserted into the groove; and
    a holding bracket having an end configured to move relative to the locking bracket while continuously supporting the locking bracket when the locking bracket is rotated, thereby maintaining a rotation state of the locking bracket.

2. The device of claim 1, wherein the locking bracket is provided in a pair and the pair of locking brackets are disposed at positions corresponding to both sides of the armrest.

3. The device of claim 1, wherein the holding bracket is configured to be rotatably hinged to the armrest case or the armrest.

4. The device of claim 3, wherein a first protrusion is formed on a peripheral portion of the locking bracket and is configured to engage with a second protrusion formed on a peripheral portion of the holding bracket.

5. The device of claim 4, further comprising a first elastic portion configured to apply a backward torque to the locking bracket when the locking bracket is rotated forward, and a second elastic portion configured to apply a forward torque to the holding bracket when the holding bracket is rotated backward.

6. The device of claim 5, wherein when the locking member is not inserted into the groove, a backward side of the second protrusion is in contact with a forward side of the first protrusion, so that a forward rotation of the locking bracket is inhibited, and when the locking member is inserted into the groove, a forward side of the second protrusion is in contact with a backward side of the first protrusion, so that a backward rotation of the locking bracket by the first elastic portion is inhibited.

7. The device of claim 6, wherein when the forward side of the second protrusion is in contact with the backward side of the first protrusion so that a contract surface is formed, a virtual line perpendicular to the contact surface goes through a rotational center of the holding bracket.

8. The device of claim 4, wherein wires are connected to a peripheral portion of the holding bracket and configured to rotate the holding bracket backward when being pulled.

9. The device of claim 1, wherein the locking member is formed in a shape of a bar and is inserted into the groove in a direction perpendicular to an axial direction of the locking member.

* * * * *